United States Patent
Serackis et al.

(10) Patent No.: US 12,062,245 B2
(45) Date of Patent: Aug. 13, 2024

(54) SYSTEM AND METHOD FOR REAL-TIME CREATION AND EXECUTION OF A HUMAN DIGITAL TWIN

(71) Applicant: Vilnius Gediminas Technical University, Vilnius (LT)

(72) Inventors: Arturas Serackis, Vilnius (LT); Dalius Navakauskas, Vilnius (LT); Dalius Matuzevicius, Vilnius (LT); Tomyslav Sledevic, Vilnius (LT); Vytautas Abromavicius, Vilnius (LT)

(73) Assignee: Vilnius Gediminas Technical University, Vilnius (LT)

( * ) Notice: Subject to any disclaimer, the term of this patent is extended or adjusted under 35 U.S.C. 154(b) by 302 days.

(21) Appl. No.: 17/462,018

(22) Filed: Aug. 31, 2021

(65) Prior Publication Data
US 2023/0067081 A1 Mar. 2, 2023

(51) Int. Cl.
*G06V 20/64* (2022.01)
*G06F 18/21* (2023.01)
(Continued)

(52) U.S. Cl.
CPC ............ *G06V 20/64* (2022.01); *G06F 18/217* (2023.01); *G06N 3/044* (2023.01); *G06N 20/00* (2019.01);
(Continued)

(58) Field of Classification Search
CPC ...... G06V 20/64; G06V 40/103; G06V 10/82; G06V 40/23; G06F 18/217; G06N 3/044;
(Continued)

(56) References Cited

U.S. PATENT DOCUMENTS 7,187,809 B2    3/2007   Zhao
7,860,301 B2   12/2010   Se
(Continued)

OTHER PUBLICATIONS

Wang, J., Zhu, M., Sun, D., Wang, B., Gao, W., & Wei, H. (2019). MCF3D: multi-stage complementary fusion for multi-sensor 3D object detection. IEEE Access, 7, 90801-90814.
(Continued)

*Primary Examiner* — Jianxun Yang
(74) *Attorney, Agent, or Firm* — Meunier Carlin & Curfman LLC

(57) ABSTRACT

The present invention presents a universal reconfigurable video stream processing system where a digital twin is applied to 3D marker cloud mapping of a set of parameters, related to the current state of the monitored person (object). The invention includes two reconfigurable units, with at least one of these units being universally adjusted for any input-output mapping application with fixed input size, fixed output size and numerical values ordered by their meaning. Each reconfigurable unit includes at least one machine learning based mathematical model with a high number of parameters and non-linear functions performing as a universal approximator and ensuring high flexibility during training process. Each unit of the presented system, which includes a machine learning based mathematical model should be trained in advance of system execution with input-output mapping examples, where the range of the input values in the training example set should cover the range of the input values that will be used during system execution.

13 Claims, 3 Drawing Sheets

(51) Int. Cl.
*G06N 3/044* (2023.01)
*G06N 20/00* (2019.01)
*G06V 40/10* (2022.01)

(52) U.S. Cl.
CPC .. *G06V 40/103* (2022.01); *G06T 2207/10024* (2013.01); *G06T 2207/20081* (2013.01); *G06T 2207/20132* (2013.01); *G06T 2207/30208* (2013.01)

(58) Field of Classification Search
CPC ...... G06N 20/00; G06N 3/0442; G06N 3/045; G06N 3/0499; G06N 3/084; G06N 3/09; G06T 2207/10024; G06T 2207/20081; G06T 2207/20132; G06T 2207/30208; G06T 2210/56; G06T 17/00
See application file for complete search history.

(56) References Cited

U.S. PATENT DOCUMENTS

| | | | |
|---|---|---|---|
| 8,305,430 | B2 | 11/2012 | Oskiper |
| 8,717,414 | B2 | 5/2014 | Kang |
| 8,879,828 | B2 | 11/2014 | Bell |
| 9,053,555 | B1 | 6/2015 | Ogale |
| 9,405,972 | B2 | 8/2016 | Moeglein |
| 9,562,971 | B2 | 2/2017 | Shenkar |
| 9,918,204 | B1 | 3/2018 | Cote |
| 9,947,111 | B2 | 4/2018 | Liu |
| 10,217,021 | B2 | 2/2019 | Roimela |
| 10,380,410 | B2 | 8/2019 | Gold |
| 10,481,265 | B2 | 11/2019 | Coddington |
| 10,670,404 | B2 | 6/2020 | Roumeliotis |
| 10,805,595 | B2 | 10/2020 | Karvounis |
| 10,997,783 | B2 | 5/2021 | Jurgenson |
| 2008/0310757 | A1 | 12/2008 | Wolberg |
| 2017/0061632 | A1 | 3/2017 | Lindner |
| 2023/0162458 | A1* | 5/2023 | Takaki ............ G06T 13/40 345/419 |

OTHER PUBLICATIONS

Griffiths, D., & Boehm, J. (2019). Improving public data for building segmentation from Convolutional Neural Networks (CNNs) for fused airborne lidar and image data using active contours. ISPRS Journal of Photogrammetry and Remote Sensing, 154, 70-83.

Wang, H., Lou, X., Cai, Y., Li, Y., & Chen, L. (2019). Real-time vehicle detection algorithm based on vision and lidar point cloud fusion. Journal of Sensors, 2019.

Liu, H., Han, X., Li, X., Yao, Y., Huang, P., & Tang, Z. (2019). Deep representation learning for road detection using Siamese network. Multimedia Tools and Applications, 78(17), 24269-24283.

Ji, H., & Luo, X. (2019). 3D scene reconstruction of landslide topography based on data fusion between laser point cloud and UAV image. Environmental Earth Sciences, 78(17), 1-12.

Cho, S., & Cho, K. (2019). Real-time 3D reconstruction method using massive multi-sensor data analysis and fusion. The Journal of Supercomputing, 75(6), 3229-3248.

Che, E., Jung, J., & Olsen, M. J. (2019). Object recognition, segmentation, and classification of mobile laser scanning point clouds: A state of the art review. Sensors, 19(4), 810.

Person, M., Jensen, M., Smith, A. O., & Gutierrez, H. (2019). Multimodal fusion object detection system for autonomous vehicles. Journal of Dynamic Systems, Measurement, and Control, 141(7).

Zhang, P., Zhao, Q., Tannant, D. D., Ji, T., & Zhu, H. (2019). 3D mapping of discontinuity traces using fusion of point cloud and image data. Bulletin of Engineering Geology and the Environment, 78(4), 2789-2801.

Li, M., Hu, Y., Zhao, N., & Qian, Q. (2019). One-Stage Multi-Sensor Data Fusion Convolutional Neural Network for 3D Object Detection. Sensors, 19(6), 1434.

* cited by examiner

SYSTEM AND METHOD FOR REAL-TIME CREATION AND EXECUTION OF A HUMAN DIGITAL TWIN

FIELD OF THE INVENTION

The present invention generally relates to the field of human digital twins, and in particular to a system and method to create a human digital twin. A system and method for creation of a digital twin is able to predict a desired output from video captured by a video camera and flexible machine learning models to predict input-output relationships. In particular, the preparation of a Digital Twin is based on video of human body movement.

BACKGROUND OF THE INVENTION

Currently there are no systems that are ready for easy and fast creation of human digital twin models with simplified desired functionality. A number of different applications may need to be performed such as monitoring of separate human body parts, their states, e.g., human head position in 3D space for binaural audio synthesis or monitoring human body motion for character animation or estimation of muscle forces and joint torques that are needed in various rehabilitation or fitness progress analysis tasks.

In binaural audio systems the movement of the head changes the position of the human ears to the active sound sources. The effect for each ear may be modeled as an audio filter with a set of parameters which changes the audio signal to include all acoustical features that are perceived by the human ear at any particular head position. In an ideal case, the system needs to have a pair of individual filters for both ears at any possible head position. A digital twin for a particular person should include estimation of head related transfer functions (HRTF) for each possible position of the head with respect to all active sound sources. Estimated HRTFs are used as a base for audio filters. Since the HRTF of a person depends on the shape of the head, torso, and outer ear, there is no way to create a universal set of HRTF. Synthesis of such individual HRTFs is possible if one can perform 3D reconstruction of all human body surfaces and apply mathematical models that match the head, outer ear, and torso shape to the coefficients of the HRTF.

The system of realistic binaural audio synthesis for individual persons requires a specific digital twin, whose output is an individual HRTF, synthesized according to the shape of the head, outer ear, shoulders, torso, and head position with respect to the sound source. Our invention simplifies the preparation of the individual twin by dividing the whole system into unified blocks. The system has two configurations (modes): execution mode and digital twin preparation mode. In the execution mode, the visual analysis-based position estimation is applied to select a particular model of the digital twin. The digital twin generates output according to the position information, used as an input. During the digital twin preparation mode, the input feature preparation for the digital twin is performed as well as the digital twin output synthesis using machine learning (ML) based models.

The visual analysis-based position estimation for binaural audio synthesis application performs continuous visual monitoring of the human face. According to the estimated face (human head) position, a digital twin generates the desired HRTF. At the stage of the digital twin preparation, the input feature estimation block gets a set of features (3D shape of the head, outer ear, torso), that are needed for HRTF synthesis and trains an AI based model to map the estimated inputs to the desired output (HRTF), using an example dataset, generated by the application of known mathematical analytical models for HRFT estimation according to the estimated features.

For an alternative application, such as character animation, the motion capture system is usually used to get the 3D joint positions of the human body and map them to the bone joints of a character 3D model for animation. The changes of the human body joint positions in time are mapped to the artificial character model bone joint positions by changing together the 3D model surface vertex coordinates, mapped with the related bone joints using dedicated 3D modeling algorithms. Our invention uses Artificial Intelligence-based prediction of the joint 3D coordinates during the execution mode as an alternative to the motion capture system. The digital twin preparation mode acts as an alternative approach to the analytical calculation algorithms, which maps the vertex coordinate changes to the model bone joint motion, directly mapped to the motion of the human joints.

Another related application, such as system for rehabilitation or fitness monitoring, is similar to the character animation, however, instead of vertex coordinate estimation that is needed for realistic rendering in animation, needs estimation of muscle forces and joint torques. Here our invention keeps the same AI based 3D joint position estimation block in execution state as an alternative to the motion capture systems. However, the digital twin preparation mode includes training of the AI based model to predict directly the muscle forces and joint torques taking 3D joint positions as an input. The current, alternative systems use dedicated algorithms of inverse kinematics to perform estimations of muscle forces and joint torques. Thus, making the whole system application specified, without any tools to easily re-train the system for new or different applications.

Our invention relates to the systems and methods which are dedicated to the calculation of specific parameters, such as muscle forces, joint torques, or less specific coefficients of the system model, e.g., signal filter coefficients from a set of inputs, that are not directly related with these desired outputs. For example, the Method for real time interactive visualization of muscle forces and joint torques in the human body (U.S. Pat. No. 7,931,604B2) is dedicated for the visual display of anatomical forces. The patented system includes: a motion capture system; a computer, receiving data from said motion capture system; and a computational pipeline disposed on said computer; that computational pipeline being configured to calculate muscle forces and joint torques in real time and visually display those forces and torques. This invention provides a process that incorporates real time 3D marker data streams coming from a motion capture system through real-time sets of algorithms that derive from the 3D markers cloud the joints centers of rotation, positions and orientations, then derives accelerations and velocities and converts those into an array of muscle forces that are passed to the 3D human body muscle model as a data stream used in the 3D color space visualization of the muscle forces and joint torques. The invention does not include the method for estimating the real-time 3D marker data streams. Such data streams may be received using multiple camera-based marker based or marker-less calibrated motion capture systems. Also, as an alternative, the specific sensors may be used for 3D marker cloud estimation, such as depth RGBD cameras or calibrated motion sensor systems with accelerometer, gyroscope, magnetometer sensors placed at each joint of the body.

Previous solutions, which uses motion capture data for human body muscle forces or joint torques estimation, rely on inverse kinematic algorithms that use a chain of mathematical operations in a forward processing way. These systems require robust and calibrated motion capture systems with precise 3D marker cloud estimation capabilities. Any erroneous 3D marker estimation result will give wrong estimates of the system output (e.g., muscle forces, joint torques). An additional post-processing method is needed to deal with such situations.

The disadvantage of use of calibrated motion capture systems is the requirement to use multiple cameras mounted in specific way over a relatively large area, or a set of specific sensors (e.g., RGBD cameras, or motion sensor set with dedicated software). The calibrated systems not only require additional hardware and software, but also might be very expensive.

Our invented system uses a single camera video stream, performs 3D marker cloud prediction by applying a set of machine learning algorithms, and uses a low precision 3D marker cloud stream. Because the method of digital twin preparation used in the present invention use an Artificial Intelligence-based multidimensional approximation to input-output mapping, the system is less sensitive to the outliers of a 3D marker cloud estimation (prediction) process. In addition, systems that use analytical mathematical expressions for estimation of the output for application, such as muscle forces and joint torques estimation from motion capture system generated 3D marker cloud, are not suitable for reconfiguration to work with alternative applications, which use also the 3D marker cloud, e.g., HRTF estimation according to the head position, estimated from face landmark 3D coordinates. The present invented system uses universal AI model for input-output mapping, thus, it requires only retraining on new input-output data mappings for new digital twin preparation.

In the applications where head tracking is used for selection of the desired HRTF, which is related to head orientation with respect to the sound source, the more common tracking solution is based on inertial sensor signal analysis. Here the accelerometer signal or fusion of accelerometer and gyroscope signals are used to estimate head orientation and motion. A pre-estimated bank of HRTF is used to prepare signal filter coefficients for audio signal processing. The HRTF bank stores transfer functions, pre-estimated for discrete head orientation (azimuth and elevation) angle step. If the current head orientation azimuth and elevation angles have no desired HRTF function, an interpolation from the HRTF, estimated for the neighboring azimuth and elevation angles, is applied. Our invented system and method are also applicable for this type of application. The head orientation is estimated using face landmarks tracking in 3D instead of using motion sensor signals. The head orientation is estimated from 3D marker cloud. The markers are the face landmarks, estimated and tracked using trained machine learning models. The HRTF selection process in our invented system does not require the pre-estimated HRTF dataset and interpolation during the execution mode, because the required HRFT is predicted by a digital twin, which is based on a flexible approximator, based on machine learning models, trained to approximate input-output mapping. Here in this application, the inputs are the 3D marker cloud which includes face landmark 3D coordinates. The outputs are the coefficients of the predicted desired HRTF function.

SUMMARY OF THE INVENTION

The invention generally relates to a system comprising two system modes: an execution mode and a digital twin preparation mode. The execution mode uses machine learning (ML) based visual analysis of the video stream, captured by a single camera, the output of the machine learning models are a set of points and their 3D coordinates. These points are used as an input to the digital twin, which is pre-trained in the digital twin preparation mode. For any particular system, where the digital twin requires 3D coordinates and uses analytical computational models for output desired estimation, our invention proposes an alternative machine learning based output prediction approach, which makes the system reconfigurable for any selected alternative application with similar input type.

The invention concerns a system and method for creation of a digital twin able to predict the desired output taking video captured by a video camera as an input. The method describes a process for preparation of the digital twin. Instead of using analytical analysis of the inputs of the digital twin to calculate the output, a ML based solution is used for output prediction. In usual implementation of the digital twin, the analytical mathematical models are used with clearly defined relations between inputs and outputs with mathematically proven representations. This approach requires separate mathematical models for each type of digital twin with a set of mathematically proven methods implemented therein. The present invention uses a universal approach by using a flexible AI based mathematical model. In our system the relations between inputs and outputs are estimated by the means of machine learning. Input and output mapping is performed by training a non-linear mathematical model using a dataset of examples on input-output mapping, which covers the full range of possible input values of the digital twin and corresponding outputs. The trained ML model predicts the output of the digital twin for any combination of the inputs in the range, limited by the training data values. The invented method uses 3D coordinates of the points, extracted using ML based models from a video sequence that was captured by video camera.

BRIEF DESCRIPTION OF THE DRAWINGS

The provided system and method will be better understood from the following detailed descriptions together with detailed accompanying drawings, wherein.

DETAILED DESCRIPTION

A digital twin is a system based on mathematical models used to imitate the behavior of real physical objects by measuring the current state of the object using a collection of sensors of a different type. In this invention, we present a system that uses only the video camera sensor for object state capture and a method for transforming individual units of the system to create an application-specific digital twin.

Figure 1:
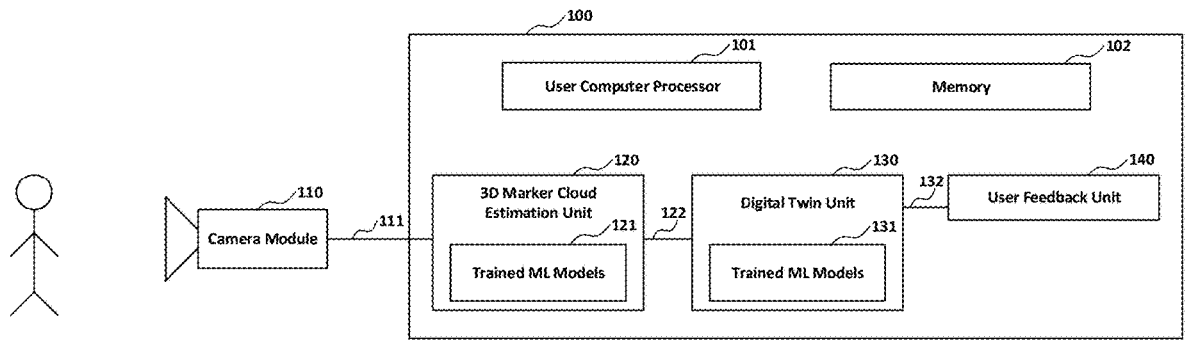
FIG. 1 is a schematic model of a preferred embodiment of system components.

FIG. 1 is a block diagram of an application of a preferred embodiment of the invention, depicting a video camera (110) which captures the target object (e.g., human body, human face, etc.) and a 3D marker cloud estimation unit (120) working on the integrated camera hardware or on a separate hardware platform (100, 101, 102), receiving the compressed video stream using any known low latency real-time video streaming protocol (111). The 3D marker cloud estimation unit includes three pre-trained machine learning models. Each model has a configurable input size (e.g., video frame or image resolution is the input of the first model) and configurable output size (e.g., a number of 3D markers for prediction are the output of the third model). Each of these three machine learning models is trained separately during the digital twin preparation mode. This is a separate process, performed once and in advance to running the system execution mode. The estimated (predicted by machine learning model No. 3) 3D marker cloud is sent as an input to the digital twin unit (130). The output of the Digital Twin Unit is sent to the user feedback unit for user-friendly interpretation of the estimated data. The user feedback unit (140) may include any known set of algorithms and software tools for presenting the input-output mapping result to the user.

The digital twin unit is dedicated to provide information about the state of the monitored object of interest using 3D marker cloud data as an input. In the present invention, a machine learning based model, model No. 4, is used as a core prediction engine of the digital twin. Machine learning model No. 4 has a configurable input (number of 3D markers can be adjusted according to the application of the digital twin) and a configurable output—an organized sequence of numeric values. Machine learning model No. 4 is composed of artificial neuron models with non-linear activation functions applied to a weighted sum of the neuron inputs. Neurons in the model are grouped into one or several groups, called layers of neurons, which are activated in parallel. Neurons between layers are connected in a feed-forward way and/or having additional connections between neurons in the same layer, and/or having additional recurrent connections when an output of the neuron is sent back and used as an input of the neuron situated in the previous layer.

In one embodiment, artificial neuron models are perceptrons connected in a feed-forward manner, thus forming a Multi-Layer Perceptron structure. Output neurons use linear activation functions, not limiting the range of the output values. The weights of the neuron connections and bias values of the neurons are initialized as random values and are updated during training using backpropagation or an alternative compatible artificial neural network training algorithm.

In another embodiment, the artificial neurons are connected in a feed-forward manner with additional feedback connections added. The outputs of the neurons in the next layer are used as additional weighted inputs of the current layer neurons. The weights of the neuron connections and bias values of the neurons are initialized as random values. They are updated during training using backpropagation or an alternative compatible artificial neural network training algorithm.

In another embodiment, the artificial neurons have different combinations of activation functions and form a Long-Short Term Memory (LSTM) type of cells or Gated Recurrent Unit (GRU) type of cells. The machine learning model can have one or several cells. If several cells are used, they may be connected to form a single layer or several layers. The weights of the neuron connections, initially stated values, and bias values of the neurons are initialized as random values. They are updated during training using backpropagation or an alternative compatible artificial neural network training algorithm that ensures the convergence of the optimization/weight update procedure according to the cost function.

In one embodiment, the system is used to estimate the head-related transfer function filter coefficients. The output of unit 130 is two vectors of coefficients (one for each filter/ear) if Finite Impulse Response filters are used in the User Feedback Unit for audio filtering. The output is two pairs of vectors if Infinite Impulse Response filters are used in the User Feedback Unit for audio filtering. Vector length in a pair may have a different number of coefficients. The coefficients are used as an additional input of unit 140 and provide two-channel audio output that imitates the acoustic impact of the ears, head, shoulders, and even the torso. In this embodiment of the system, the user feedback unit is responsible for the auralization of the audio according to the predicted HRTF. Therefore, known algorithms, which require audio and filter coefficients in the input to perform an auralization, individual for each human ear, are used in unit 140 for this application.

In an alternative embodiment, the system estimates human body muscle forces or joint torques for a set of joints of a fixed order. The output of unit 130 is a matrix (or a table) of numerical values arranged in such a way that rows of the matrix (or a table) indicate the joint number and/or joint pairs, and columns indicate joint torques (for joints) and/or muscle forces (for joint pairs). The matrix (or table) is then used to form feedback to the user of the system in unit 140. In this embodiment, the results are presented visually by the visualization and rendering algorithms are used in the feedback unit (140).

In accordance with one or more other embodiments of the present invention, the 3D marker cloud estimation unit (120) receives the output image from the camera module unit (110). The input video is divided into frames, each frame representing a separate input image and supplied separately to unit 120. The output of unit 120 is a 3D marker cloud.

Figure 2:
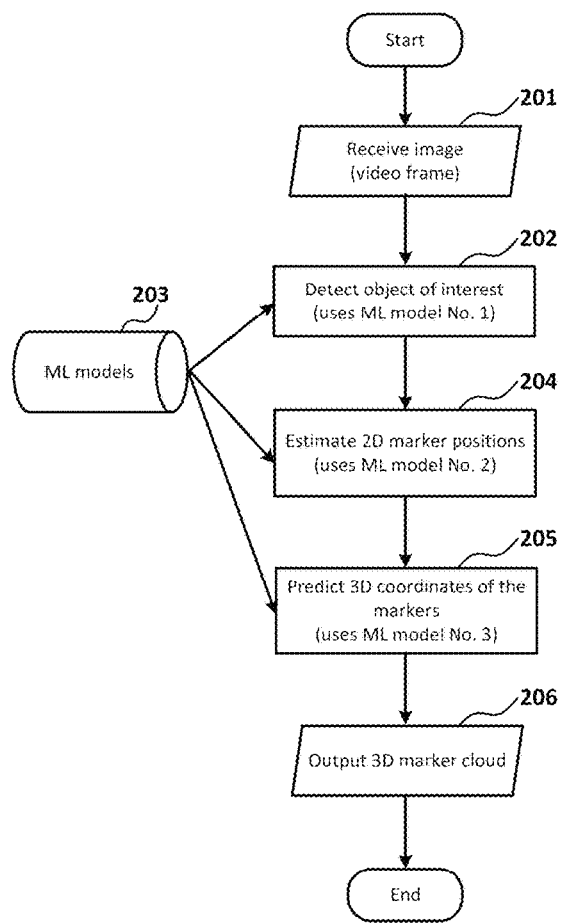
FIG. 2 is a schematic diagram of block 120, an algorithm for 3D marker cloud estimation.

The 3D marker cloud estimation unit (120) includes several separate stages of image (an individual video frame) processing. The pipeline of 3D marker cloud estimation has three processing stages (see FIG. 2). During the first stage, block 202, an object of interest is detected in an image. Object detection is performed by applying ML model No. 1. The basis of ML model No. 1 is a convolutional neural network with several convolutional layers dedicated for feature extraction and a feed-forward neural network for processing of features, estimated by convolutional layers. Input is an uncompressed RGB image forming an array of size M×N×3. Here M is the height, N is the width of the image. The first M×N size matrix in the array defines the red color component intensity of the image. The second matrix defines green color component intensity, and the third matrix defines the blue color component intensity. The number of convolutional layers, number of spatial filters in the layer, the size of the filter, padding type, pooling layer type can be defined by the user during ML model training (see the method in FIG. 4). Here any known convolutional neural network structures, such as YOLO, ResNet, or other alternatives that are compatible with the same types of inputs and outputs, can be applied. The coefficients of the spatial filters in the convolutional layers are initiated as small random values and are estimated during the iterative process of neural network training (402). The output of the feed-forward neural network used in this model gives 2D coordinates of the bounding box, the width, and the height of the bounding box. The size and the position of the bounding box show the boundaries of the object, found by ML model No. 1. A single image may have several objects found by ML model No. 1. Each of these objects has a unique bounding box. The bounding box is used to crop an image and to prepare this image for further processing at the second stage (204) of unit 120. If more than one object is found in the image, the cropped image of each object is processed separately by ML model No. 2, executed in block 204.

Machine learning model No. 2 has a similar structure to ML model No. 1. A convolutional neural network is used to extract features of the cropped image (the output of block 202). The extracted features are sent to the feed-forward neural network. The output of the feed-forward network gives a 2D heat map, where the peaks of the heat map indicate 2D coordinates of the markers found in the image. Training of ML model No. 2 is performed iteratively using data examples, prepared from ML model No. 1 output, obtained after ML model No. 1 finishes training, according to the method in FIG. 4.

Machine learning model No. 3, executed in block 205, uses 2D marker coordinates, estimated in block 204, as inputs and predicts the depth axis coordinate for each marker. Machine learning model No. 3 uses known recurrent neural network structures, where already estimated values of the neuron outputs are used as inputs together with new input data received from block 204. In one embodiment, the recurrent neural network may use cells of LSTM type. In another embodiment, the recurrent neural network may use GRU type cells. An alternative embodiment may use ML model structures with feedback connection of any other architecture. The output of block 205 is a 3D marker cloud which is changed into a format that is compatible for interchanging between 120 and 130 units in block 206.

Figure 3:
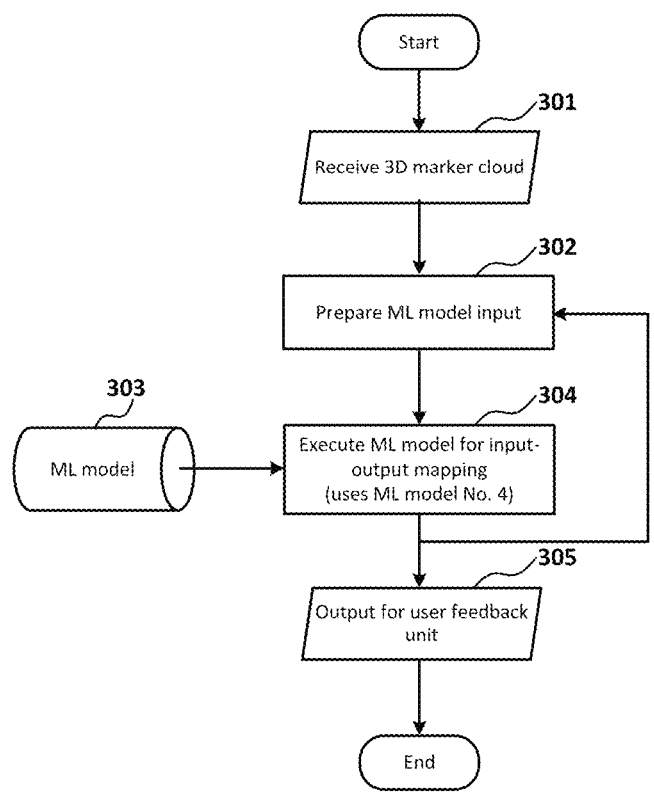
FIG. 3 is a schematic diagram of block 130, an algorithm for Digital Twin output estimation.
Figure 4:
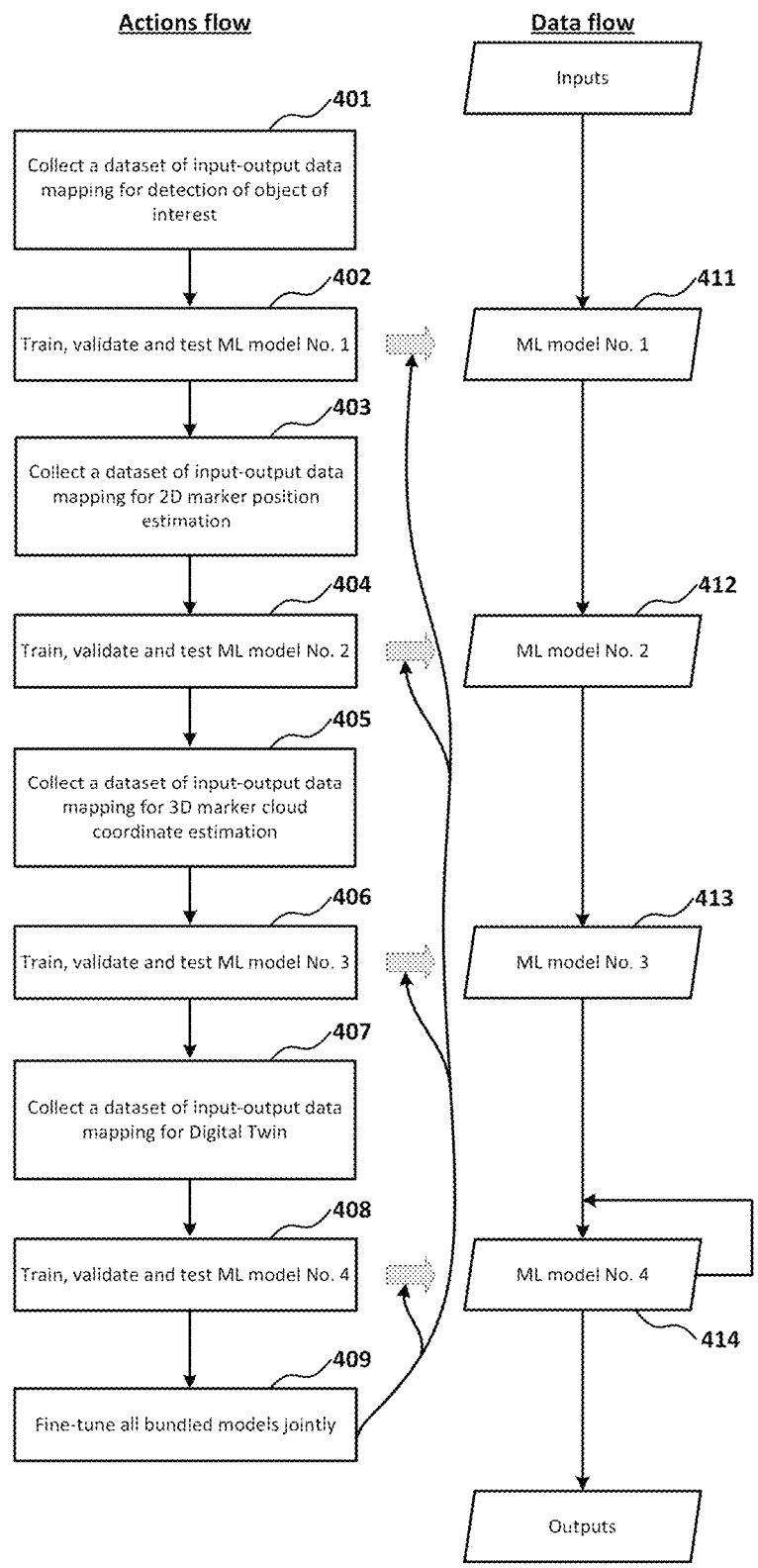
FIG. 4 is a schematic diagram of the method to prepare a system to act as a digital twin.

The digital twin unit 130 uses a separate ML model, model No. 4, trained according to the method in FIG. 4, blocks 407, 408, and 414. The data processing and ML model No. 4 execution diagram is shown in FIG. 3. Before ML model No. 4 is executed in bloc 304, the input data is prepared (302), the 3D marker cloud, obtained from unit 120, is combined with a previously estimated output of the model, obtained from block 304. In one embodiment, ML model No. 4 may have feed-forward structure-based neural network architectures. In another embodiment, ML model No. 4 can be based on recurrent neural network architecture, with RNN, LSTM, GRU, or other neural network cells with recurrent (feedback) connections between one or several neurons. The output of the ML model is an array of numerical values arranged according to the application of the digital twin unit in block 305. In one embodiment, the estimated parameters are related to the finite impulse response filter coefficients that form a two vector array where each vector is a set of filter coefficients for the human ear. Individual coefficients are estimated for the left ear and individual coefficients for the right ear.

In one embodiment, a digital twin unit is dedicated to estimating human body muscle forces and moments using tracked 3D coordinates of the human body joints as inputs. 3D coordinates need to be predicted and sent as a 3D marker cloud for further processing in the digital twin unit (130). Three separate pre-trained ML models have the following purpose. The pre-trained ML model No. 1 performs detection of the human body in an image. The output of the ML model No. 1 is one or several rectangular areas (if more than one person is detected in the image) of the image where a view of a single human body fits in each rectangular. The limits of each rectangular area are used to crop the initial input image and create one or several new images with a single human body in each. The cropped image is then used as input to the pre-trained ML model No. 2. The pre-trained ML model No. 2 takes a cropped image as an input and produces a heat map in the output, where the local peaks of the heat map indicated the predicted positions of the human joint 2D projection to the camera plane. The pre-trained ML model No. 3 takes the human joint 2D projections as input and estimates the missing predicted depth coordinate values for each joint. Two coordinates are taken from the output of the ML model No. 2 and are concatenated with the third coordinate, predicted by the ML model No. 3 and are represented as a 3D marker cloud.

In the above embodiment, the output of ML model No. 2 (204) represents the individual 2D poses of a person. The output of block 204 may be represented in such a way that it can be further used in block 205. In one embodiment, this output can be represented as a cropped input image with additionally marked joint locations of a person. In another embodiment, the output of block 204 can be expressed in coordinates of the predicted joint location in an input image. The location of joints can also be represented in pixels from the cropped input image. Additionally, each joint can include a reliability score or its binary representation based on a threshold. The 3D coordinates of the markers are predicted in block 205. Machine learning model No. 3 in block 205 is based on the known mathematical models that are developed for prediction of the next time series value taking into account current external input (2D coordinates of joints) and previous outputs (the previously predicted third coordinate of each joint). The predicted third coordinate is predicted depth information for each joint and is concatenated with 2D coordinates obtained from block 204. Machine learning model No. 3 is used for prediction of a third coordinate for each 2D coordinate point. To train the machine learning model, only 2D coordinates are needed as inputs and only depth estimates are needed as outputs in the training data. The context that Machine learning model should learn during training is the dependency of depth estimate changes with relation to the changes of 2D coordinate values over time. The machine learning model does not need to have a photorealistic image as the input to extract additional context information related to the depth of the markers. The output of block 205 is represented in the same nature as the input of this module, with additionally included depth information. Depth is considered distance relative to the camera location.

In this embodiment, the digital twin unit (130) performs forces and moments estimation using pre-trained ML model No. 4. The digital twin unit takes in the output in the form of 3D marker cloud from the three-stage unit (120). The computed output of the digital twin unit (130) consists of joint and muscle state data. The state data includes at least one of joint angle, joint angular velocity, joint state, joint moment, muscular model, muscular geometry, muscle forces and vectors, and muscle length.

The user feedback unit (140) is created individually for each application and is not universal. The method presented in this invention (see FIG. 4) does not cover the preparation of the user feedback unit. Units 120 and 130 are adaptable and reconfigurable and are encompassed in the definition of the present invention. The user feedback unit 140 is used for output data interpretation and presentation in the required form to the user. Thus it should be designed for the intended application.

In one embodiment, where the human body muscle forces and joint torques are predicted using the digital twin unit 130, the user feedback unit 140 receives the 3D coordinates of the human body joints digital twin unit. It illustrates the motion activity of at least one limb. In one of the embodiments, the output of unit 130 presents at least one charac- teristic useful for the selected application. Such characteristics include a muscular load of at least one limb, general muscular load, muscular tension of at least one limb, general muscular tension, risk of injury for at least one joint, muscle, muscular fatigue level of at least one limb, general muscular fatigue, general effectiveness of the investigated motion. The output of unit 130 is presented to the user feedback unit 140 for visualization.

FIG. 4 shows a diagram of the method used for the preparation of ML models for the invented system. Critical steps in this method are the blocks 403, 405, and 407, where the preparation of training data is performed. The training data consists of input and output data mappings, where a single instance of input data has a single set of desired output values. Although all the models in blocks 402, 404, 406, and 408 can be trained separately, the data used for training should include output examples obtained by the previous stage ML model. Machine learning model No. 2, trained in block 404 uses data prepared in block 403, where inputs of 404 should include outputs—cropped images of objects found in video frame image—obtained after execution of the pre-trained ML model No. 1. In the dataset used for training ML model No. 3, there should be included the outputs obtained after execution of the pre-trained ML model No. 2. After all three ML models of unit 120 are trained in blocks 402, 404, 406, the dataset for training the digital twin unit 130, ML model No. 4 is prepared. The data preparation for training ML model No. 4 is a bit more complicated because the inputs of this model include the output of unit 120, complemented with the outputs of ML model No. 4, obtained during the previous execution step. Therefore, at the initial iteration of the ML model training, the desired outputs used with the last input instance are used as complementary inputs. After each training epoch, wherein one epoch all examples are passed through the training process, the pre-trained ML model execution outputs are included to replace a part of complementary inputs, increasing the estimated output balance with respect to desired outputs after each training epoch. In one embodiment, for the first training epoch, at iteration n the inputs consist of ML model No. 3 outputs and complementary added desired outputs of ML model No. 4 for iteration n−1. For the second training epoch, at iteration n+1 the inputs consist of ML model No. 3 outputs and complementary added n iteration outputs of ML model No. 4, where 99% are the desired outputs and 1% are the estimated outputs of already pre-trained after 1 epoch ML model No. 4.

The invention claimed is:

1. A system for real-time creation and execution of a human digital twin
for a user-specified application, comprising:
a video camera device configured to capture and stream video; and
one or more computer processing devices capable of storing and processing data;
wherein the following computer executable methods instructions are stored implemented on the one or more computer processing devices and when executed by the one or more computer processing devices, cause the system to perform steps comprising:
preparing a plurality of machine learning models including the steps of training, validating and testing each model; wherein the plurality of machine learning models includes a machine learning model for object detection, a machine learning for estimating 2D markers, a machine learning for estimating 3D marker clouds, and a machine learning for creating and executing the human digital twin;
capturing video stream using a video camera device and parsing individual video frames to be used as input; and
repeating the following steps for each video stream parsed frame input:
(a) executing the machine learning model for object detection using the video stream parsed frame input and sending output to the machine learning model for estimating 2D markers;
(b) executing the machine learning model for estimating 2D markers and sending results to the machine learning for estimating 3D marker clouds;
(c) executing the machine learning model for estimating 3D marker clouds and sending output to the machine learning model for creation and execution of the human digital twin;
(d) preparing the machine learning model for creation and execution of the human digital twin by combining the 3D marker cloud output and the output from a previous execution of the machine learning model for creation and execution of the human digital twin;
(e) executing the machine learning model for creation and execution of the human digital twin and sending output to an application-specific user feedback unit; and
(f) re-training the machine learning model for creation and execution of the human digital twin using the most recent output.

2. A method for real-time creation and execution of a human digital twin
for a user-specified application, the method comprising the following steps:
preparing a plurality of machine learning models including the steps of training, validating and testing each model; wherein the plurality of machine learning models includes a machine learning model for object detection, a machine learning for estimating 2D markers, a machine learning for estimating 3D marker clouds, and a machine learning for creating and executing the human digital twin;
capturing video stream using a video camera device and parsing individual video frames to be used as input; and
repeating the following steps for each video stream parsed frame input:
(a) executing the machine learning model for object detection using the video stream parsed frame input and sending output to the machine learning model for estimating 2D markers;
(b) executing the machine learning model for estimating 2D markers and sending results to the machine learning for estimating 3D marker clouds;
(c) executing the machine learning model for estimating 3D marker clouds and sending output to the machine learning model for creation and execution of the human digital twin;
(d) preparing the machine learning model for creation and execution of the human digital twin by combining the 3D marker cloud output and the output from a previous execution of the machine learning model for creation and execution of the human digital twin;

(e) executing the machine learning model for creation and execution of the human digital twin and sending output to an application-specific user feedback unit; and (f) re-training the machine learning model for creation and execution of the human digital twin using the most recent output.

3. The method of claim 2, wherein the video stream parsed frame input is an uncompressed RGB image forming an array of size M×N×3, where NI is the height and N is the width of the image; and wherein the first M×N size matrix in the array defines the red color component intensity of the image, the second matrix defines green color component intensity, and the third matrix defines the blue color component intensity.

4. The method of claim 2, wherein the machine learning model for object detection further comprises a convolutional neural network with two or more convolutional layers dedicated for feature extraction and a feed-forward neural network for processing of features, estimated by convolutional layers; and wherein the coefficients of the spatial filters in the convolutional layers are initiated as small random values and are estimated during the preparation of the machine learning model;

wherein the output of the feed-forward neural network is a cropped image of a detected object; the object being defined by the 2D coordinates of a bounding box including the width, the height, and the position of the bounding box;

wherein a frame may have several objects, and each of the objects has a unique bounding box; and wherein the cropped image of each object s sent separately to the machine learning model for estimating 2D markers.

5. The method of claim 4, wherein the number of convolutional layers, the number of spatial filters in a layer, the size of the spatial filter, padding type, and pooling layer type are defined by a user.

6. The method of claim 2, wherein the machine learning model for estimating 2D markers further comprises a convolutional neural network that is trained to extract markers of the cropped image and a feed-forward neural network that is trained to produce a 2D heat map;

wherein the peaks of the heat map indicate 2D coordinates of the markers found in the image; and wherein the output is a set of 2D marker coordinates.

7. The method of claim 2, wherein the machine learning model for estimating a 3D marker cloud further comprises recurrent neural network structures that are trained to predict a depth axis coordinate for each 2D marker coordinate from the output of the machine learning model for estimating 2D markers;

wherein the recurrent neural network uses previous output from its own model when predicting depth axis coordinates; and wherein the output is a 3D marker cloud containing the 20 marker coordinates and the depth axis coordinate.

8. The method of claim 7, wherein the recurrent neural network uses cells of LSTM type or GRU type.

9. The method of claim 2, wherein the machine learning model for creating and executing the human digital twin further comprises either a feed-forward structure-based neural network architecture or a recurrent neural network architecture; wherein the output is an array of numerical values configured according to the user-specified application.

10. The method of claim 2, wherein the step of preparation of the plurality of machine learning models further comprises:

collecting datasets of input-output data mapping for object detection;

training, validating, and testing the machine learning model for object detection;

passing testing output of the machine learning model for object detection to the machine learning model for estimating 2D markers;

collecting datasets of input-output data mapping for estimating 2D markers;

training, validating, and testing the machine learning model for estimating 2D markers;

passing testing output of the machine learning model for estimating 2D markers to the machine learning model for estimating 3D marker clouds;

collecting dataset of input-output data mapping for estimating 3D marker clouds;

training, validating, and testing the machine learning model for predicting 3D marker clouds;

passing testing output of the machine learning model for estimating 3D markers to the machine learning model for the creation and execution of the human digital twin;

collecting dataset of input-output data mapping for the human digital twin; and training, validating, and testing the machine learning model for the creation and execution of the human digital twin.

11. The method of claim 2, wherein the specified end-user application is estimation of head-related transfer function-related filter coefficients, wherein the output of the human digital twin machine learning model is configured to be either two vectors of coefficients, one for each filter or ear, or is two pairs of vectors, wherein the vector length in a pair has a different number of coefficients to provide two-channel audio output.

12. The method of claim 2, wherein the user-specified application is estimation of human body muscle forces and moments using tracked 3D coordinates of the human body joints as inputs to the human digital twin;

wherein the machine learning model for object detection performs detection of the human body in an image, and the output is a rectangular area of the image of a single human body that is cropped from an input image;

wherein the cropped image is used as input to the machine learning model for estimating 2D markers and is used to produce a 2D heatmap of the predicted positions of the human joint 2D projection;

wherein the human joint 2D projections are used as input for the machine learning model from estimating 3D marker clouds, and the model estimates the depth coordinate values for each joint coordinate; and wherein the output is a 3D marker cloud containing coordinates, x, y, and depth, for each joint marker.

13. The method of claim 2, wherein the input and output of each of the plurality of machine learning models are of configurable size.

* * * * *